United States Patent [19]
Erpenbeck

[11] Patent Number: 5,167,257
[45] Date of Patent: Dec. 1, 1992

[54] EXHAUST DIRECTING VALVE MECHANISM FOR A VEHICLE

[75] Inventor: Stephen A. Erpenbeck, Clayton, N.C.

[73] Assignee: Caterpillar Inc., Peoria, Ill.

[21] Appl. No.: 858,730

[22] Filed: Mar. 27, 1992

[51] Int. Cl.$^5$ .............................................. F16K 11/02
[52] U.S. Cl. .................................. 137/875; 251/354
[58] Field of Search ....................... 251/349, 351, 354; 137/872, 875

[56] References Cited

U.S. PATENT DOCUMENTS

| | | | |
|---|---|---|---|
| 3,039,493 | 6/1962 | Licari | 137/625.44 |
| 4,143,677 | 3/1979 | Schell | 137/875 |
| 4,342,333 | 8/1982 | Mizuno et al. | 137/875 X |

Primary Examiner—John C. Fox
Attorney, Agent, or Firm—Calvin E. Glastetter

[57] ABSTRACT

Exhaust mechanisms are useful for directing exhaust gas flow from an inlet to either a truck dump body or a muffler means. A mechanism for a vehicle includes a valve body haivng a valving element pivotally mounted to a telescopically movable tube moveable to a first position upon movement of the dump body to a raised position to direct exhaust from the engine to the muffler. With the dump body in the lowered position, the valving element is in a second position to direct exhaust to the dummp body. The valving element interacts with an upper stop plate when the tube moves upward and interacts with a lower stop assembly when the tube moves downward.

9 Claims, 4 Drawing Sheets

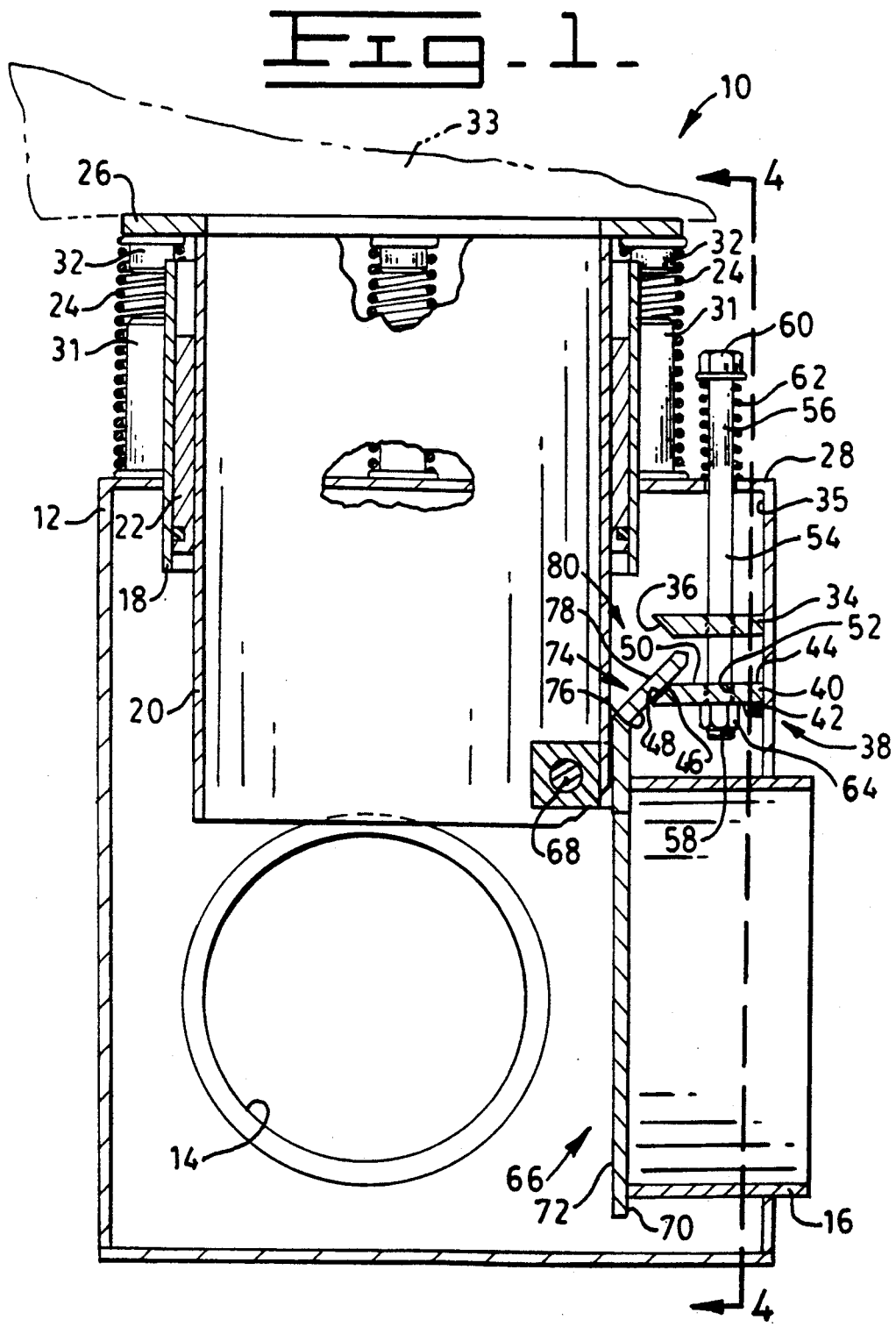

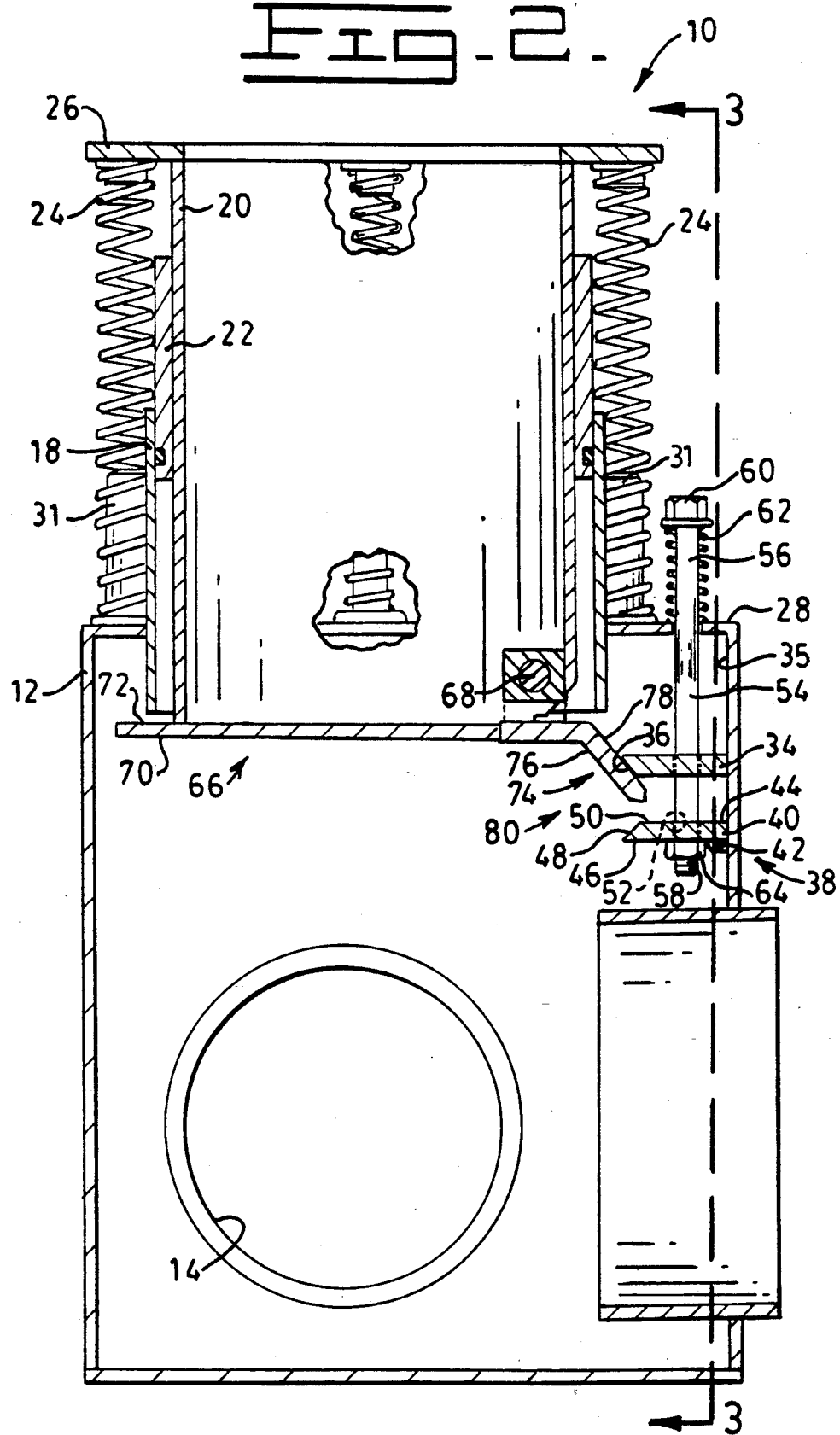

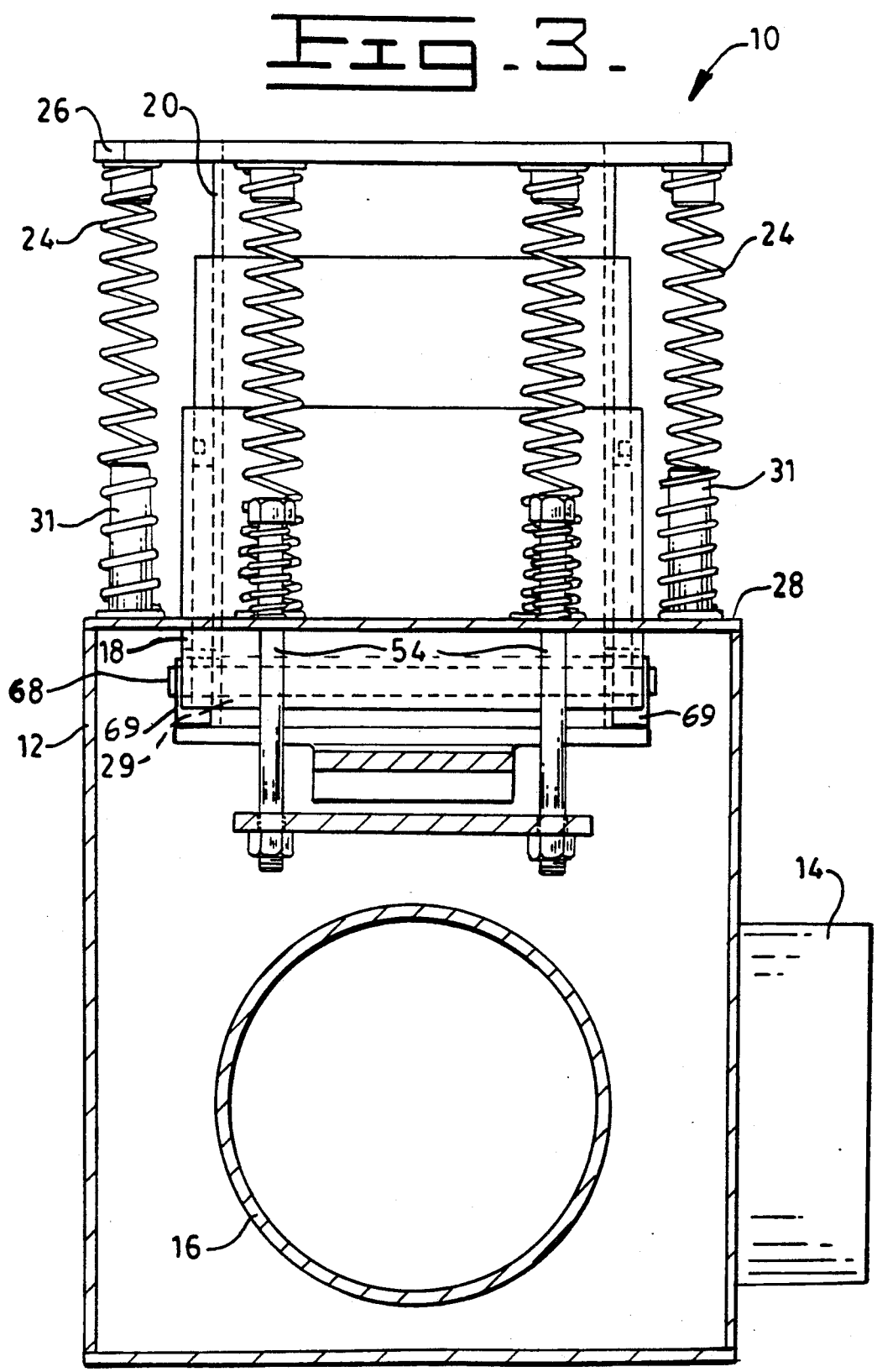

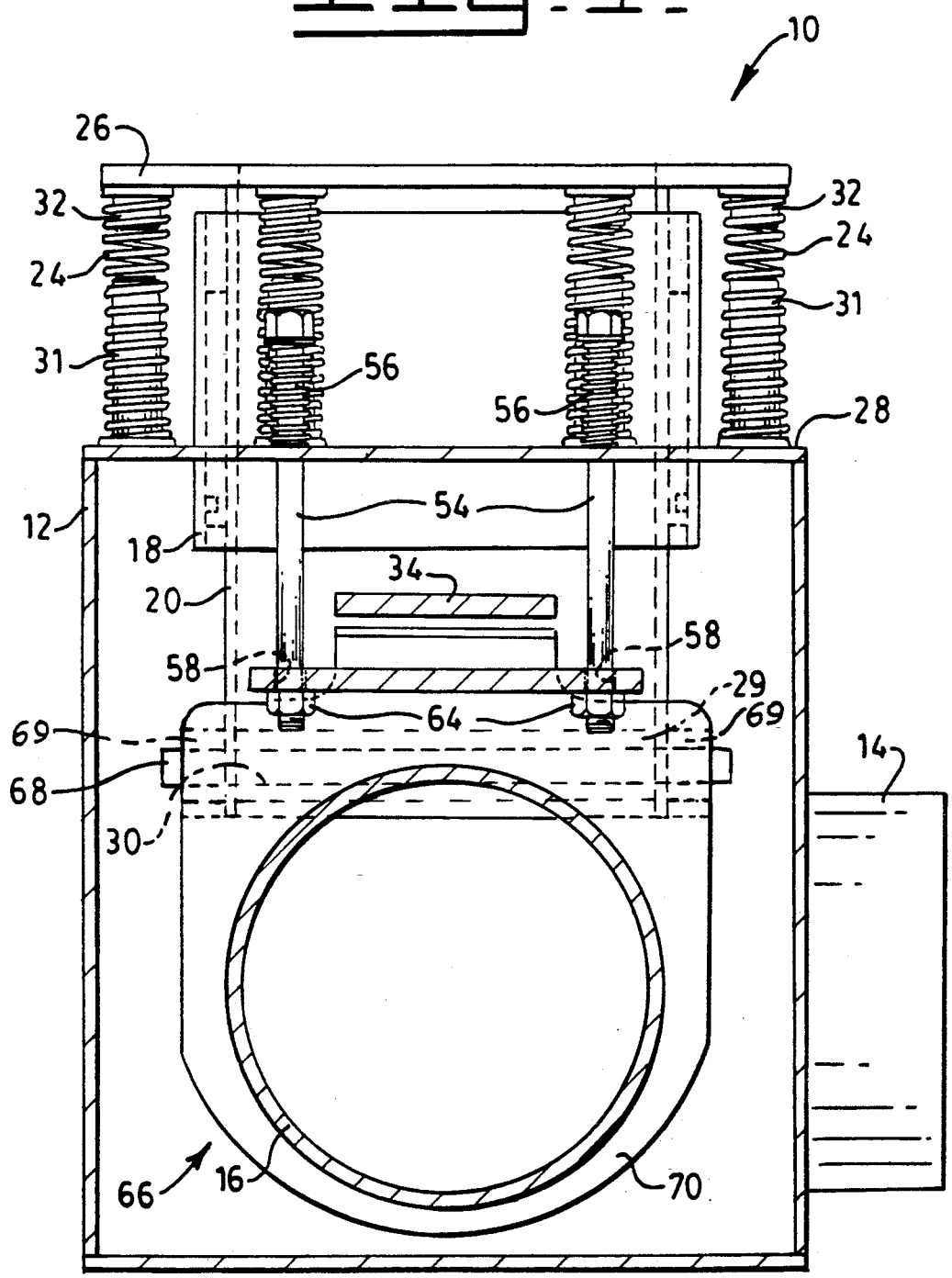

EXHAUST DIRECTING VALVE MECHANISM FOR A VEHICLE

DESCRIPTION

1. Technical Field

This invention relates generally to an exhaust system for a vehicle having a dump body and more particularly to a mechanism for directing vehicle engine exhaust gases through the dump body or through other exhaust means.

2. Background Art

Exhaust valve mechanisms are commonly used to direct exhaust gases to a truck dump body when the truck dump body is in the down position or to a muffler means when the truck dump body is in the up position. In an example, it is common to use a valve having an external linkage arrangement connected to and being movable by a member movably by the truck dump body. An overcenter spring is used to move a valving element to block one of the outlets. One problem associated with such an arrangement is that the linkage arrangement can be costly to produce and the spring moving the valving element is subject to breakage.

The present invention is directed to overcoming one or more of the problems as set forth above.

DISCLOSURE OF THE INVENTION

In one aspect of the present invention, a valve mechanism includes a valve body having an inlet and a first and a second outlet. A flanged tube is telescopically mounted within the second outlet. A valving element is pivotally mounted on the flanged tube within the valve body and is movable between a first position and a second position. Means for providing pivotal movement of the valving element is positioned within the valve body.

The present invention provides a valve mechanism which provides a simple and positive arrangement for blocking one of the outlets while allowing the other outlet to receive exhaust flow from the inlet.

BRIEF DESCRIPTION OF THE DRAWINGS

FIG. 1 is a side sectional view of the valve of the present invention with the valving element in one position;

FIG. 2 is a section view of the valve as shown in FIG. 1 with the valving element in another position;

FIG. 3 is a rear sectional view as shown by section 3—3 in FIG. 2;

FIG. 4 is a rear sectional view as shown by section 4—4 in FIG. 1.

BEST MODE FOR CARRYING OUT THE INVENTION

Shown in the drawings is a valve mechanism 10 including a valve body 12 having an inlet 14 communicating therewith, through which exhaust gas from an engine (not shown) enters the valve body 12. The valve body 12 also includes a lateral outlet 16 which communicates exhaust to a muffler means (not shown). The valve body 12 further includes an upwardly disposed outlet tube 18. A flanged tube 20, having a sealing collar 22 positioned between the outlet tube 18 and the flanged tube 20, is slidably mounted in the outlet tube 18 and is resiliently biased in an upward direction relative to the outlet tube 18 by a plurality of springs 24 interposed between a flange 26 at one end of the tube 20 and an upper surface 28 of the valve body 12. The flanged tube 20 at the end opposite the flange 26 includes a cresent shaped mounting bracket 29 mounted within the tube 20. The bracket 29 a hole 30 therethrough aligned with holes in the tube 20. Each of the springs 24 is disposed on an upwardly extending post 31 secured to the upper surface 28 of the valve body 12 and a downwardly extending post 32 secured to the flange 26 of the tube 20. The tube 20 is maintained in the down position by a vehicle dump body 33 when the dump body 33 is in the down position. An upper stop plate 34 is secured to a wall 35 of the valve body 12 above the outlet 16 and extends therefrom toward the tube 20. The distal end of the upper stop plate 34 has an inclined downwardly facing surface 36. A lower stop assembly 38 includes a stop plate 40 positioned between the upper stop plate 34 and the outlet 16 and is pivotally attached to the wall 35 of the valve body 12 by a pin 42. The stop plate 40 has a first end 44 which contacts the wall 35 of the valve body 12, a second end 46 having an inclined upwardly facing surface 48, and an intermediate portion 50 having a pair of spaced holes 52. The stop assembly 38 includes a pair of stop rods 54. Each of the stop rods 54 has a first end portion 56 extending upwardly above the valve body 12 and a threaded second end portion 58 extending downwardly into the valve body 12. The stop rod 54 passes through one of the holes 52 in the stop plate 40. The first end portion 56 of the stop rod 54 has an enlarged end 60 and a spring 62 is positioned around the rod 54 between the enlarged end 60 and the upper surface 28 of the valve body 12. A nut 64 is threadably fastened to the second end portion 58 below the stop plate 40.

A valving element 66 in the form of a flapper is pivotally mounted to the flanged tube 20 by means of a pin 68 extending through the hole 30 of the mounting bracket 29, the flanged tube 20 and also a pair of aligned brackets 69 attached to the valving element 66 to provide movement between a first position and a second position. The valving element 66 has a first surface 70 which interacts with the outlet 16, and a second surface 72 which interacts with the tube 20, to block exhaust gas flow, as shown in FIG. 2. The valving element 66 includes an angled extension 74 having a first surface 76 which interacts with the inclined upwardly facing surface 48 of the stop plate 40 and a second surface 78 which interacts with the inclined downwardly facing surface 36 of the upper stop plate 34. The upper stop plate 34, lower stop assembly 38 and the angled extension 74 form a means 80 for moving the valving element 66 between the first and second positions.

INDUSTRIAL APPLICABILITY

In the use of the present invention, the valve mechanism 10 is in the down position when the dump body 33 is resting on the flange 26, as shown in FIG. 1. When in the down position, the valving element 66 blocks the outlet 16 to prevent the flow of exhaust gas to the muffler means.

With movement of the dump body 33 toward the dump position, the dump body 33 is lifted away from the valve body 12 however the tube 20 remains in contact with the dump body 33 under the resilience of the springs 24. During upward movement of the tube 20, the second surface 78 on the angled extension 74 of the valving element 66 will engage the upper stop plate 34 and pivot around the pin 68. When the second surface 72 of the valving element 66 contacts the tube 20, pivotal movement will be stopped. The interaction of the second surface 78 with the inclined downwardly facing surface 36 of the upper stop plate 34 will stop upward movement of the tube 20 as shown in FIG. 2. As the dump body 33 rises to the up position, exhaust gas flow into the tube 20 and the dump body 33 will be stopped and exhaust gas will flow through the outlet 16 to the muffler means.

As the dump body 33 moves toward the down position, it will contact the flange 26 and overcome the force of the springs 24 and move the tube 20 downwardly. As the tube 20 is moved downwardly, the first surface 76 of the valving element 66 extension 74 will contact the inclined upwardly facing surface 48 of the stop plate 40 causing the valving element 66 to pivot away from the tube 20 and move toward the outlet 16. Continued downward movement will slide the surface 76 along the inclined upwardly facing surface 48 to pivot the valving element 66 into engage with the outlet 16. To allow for extended movement, the lower stop plate 40 will have to be pivoted downwardly by overcoming the force of the springs 62.

In view of the foregoing, it is readily apparent that the structure of the present invention provides a simple low cost exhaust valve mechanism which provides structure to pivot a valving element for directing exhaust flow to a truck body or a muffler means.

Other aspects, objects and advantages of this invention can be obtained from a study of the drawings, the disclosure and the appended claims.

I claim:

1. A valve mechanism comprising:
   a valve body having an inlet, a first outlet and a second outlet;
   a flanged tube telescopically mounted within the second outlet being upwardly and downwardly moveable;
   a valving element pivotally mounted on the flanged tube within the valve body moveable between a first position wherein the first outlet is blocked and a second position wherein the second outlet is blocked; and
   means for pivotally moving the valving element in response to movement of the flanged tube is mounted within the valve body, the means includes a pivotal stop plate which interacts with the valving element as the flanged tube is moved downwardly to the first position and a fixed stop plate which interacts with the valving element as the flanged tube is moved upwardly to the second position.

2. A valve mechanism of claim 1 wherein the means for providing movement of the valving element includes an angled extension projecting therefrom.

3. A valve mechanism of claim 2 wherein the fixed stop plate is mounted to a wall of the valve body above the first outlet.

4. A valve mechanism of claim 3 wherein the pivotal stop plate is mounted to the wall of the valve body between the fixed stop plate and the first outlet 5. A valve mechanism of claim 4 wherein the pivotal stop plate is resiliently positioned upward by a spring.

6. A valve mechanism of claim 5 wherein the pivotal stop plate includes an inclined upwardly facing surface.

7. A valve mechanism of claim 6 wherein the fixed stop plate includes an inclined downwardly facing surface.

8. A valve mechanism of claim 7 wherein the inclined surface of the pivotal stop plate interacts with a first surface of the angled extension to block exhaust to the first outlet.

9. A valve mechanism of claim 8 wherein the inclined surface of the fixed stop plate interacts with a second surface of the angled extension to block exhaust to the second outlet.

* * * * *